US012444860B2

(12) United States Patent
Takahashi et al.

(10) Patent No.: US 12,444,860 B2
(45) Date of Patent: Oct. 14, 2025

(54) TERMINAL-EQUIPPED ELECTRIC WIRE, WIRING HARNESS, AND METHOD FOR MANUFACTURING TERMINAL-EQUIPPED ELECTRIC WIRE

(71) Applicants: FURUKAWA ELECTRIC CO., LTD., Tokyo (JP); FURUKAWA AUTOMOTIVE SYSTEMS INC., Inukami-gun (JP)

(72) Inventors: Hirokazu Takahashi, Tokyo (JP); Hirofumi Kawanaka, Tokyo (JP); Junya Takeshita, Tokyo (JP); Tetsuya Hiraiwa, Inukami-gun (JP); Takuto Wada, Inukami-gun (JP); Kengo Mitose, Tokyo (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 392 days.

(21) Appl. No.: 18/148,721

(22) Filed: Dec. 30, 2022

(65) Prior Publication Data

US 2023/0133056 A1 May 4, 2023

Related U.S. Application Data

(63) Continuation of application No. PCT/JP2021/025453, filed on Jul. 6, 2021.

(30) Foreign Application Priority Data

Jul. 7, 2020 (JP) ................................ 2020-117111
Nov. 26, 2020 (JP) ................................ 2020-196035

(51) Int. Cl.
*H01R 4/18* (2006.01)
*B60R 16/02* (2006.01)
(Continued)

(52) U.S. Cl.
CPC ......... *H01R 4/183* (2013.01); *B60R 16/0207* (2013.01); *H01R 13/11* (2013.01); *H01R 43/16* (2013.01)

(58) Field of Classification Search
CPC ........ H01R 4/183; H01R 13/11; H01R 43/16; B60R 16/0207
(Continued)

(56) References Cited

U.S. PATENT DOCUMENTS 1,909,248 A * 5/1933 Benkelman ............ H01C 1/148 338/237
3,156,762 A * 11/1964 Matthysse ................ H01R 4/22 439/429
(Continued)

FOREIGN PATENT DOCUMENTS

GB 691157 A 5/1953
JP 61-46827 U 3/1986
(Continued)

OTHER PUBLICATIONS

Extended European Search Report issued on Aug. 22, 2023 in European Application 21838190.3, 11 pages.
(Continued)

*Primary Examiner* — Peter G Leigh
(74) *Attorney, Agent, or Firm* — Oblon, McClelland, Maier &Neustadt, L.L.P.

(57) ABSTRACT

A terminal-equipped electric wire includes a terminal and a coated conductive wire, which are electrically connected to each other. A crimp part of the terminal is a part that crimps the coated conductive wire and includes a conductive wire crimp part crimping a conductive wire exposed from a coating on a tip-end side of the coated conductive wire, and a coating crimp part crimping the coating of the coated conductive wire. The coated conductive wire includes a
(Continued)

tension member disposed in an approximate center of a cross section, and a conductive wire including a plurality of conductors disposed on an outer periphery of the tension member. The tension member includes a plurality of strands. The conductive wire is crimped at the conductive wire crimp part from the entire circumference of the circumferential direction of the conductive wire. Preferably, a tensile strength of the tension member is greater than that of the conductive wire.

11 Claims, 11 Drawing Sheets

(51) Int. Cl.
*H01R 13/11* (2006.01)
*H01R 43/16* (2006.01)

(58) Field of Classification Search
USPC .......................................................... 439/877
See application file for complete search history.

(56) References Cited

U.S. PATENT DOCUMENTS

| | | | | | |
|---|---|---|---|---|---|
| 5,775,934 | A * | 7/1998 | McCarthy | H01R 9/053 439/427 |
| 6,015,953 | A * | 1/2000 | Tosaka | H01R 4/20 174/79 |
| 6,123,567 | A * | 9/2000 | McCarthy | H01R 9/053 439/427 |
| 2003/0054700 | A1 * | 3/2003 | Korte | H01R 4/5033 439/762 |
| 2016/0172769 | A1 * | 6/2016 | Kamoshida | H01R 4/188 439/877 |
| 2016/0190711 | A1 * | 6/2016 | Kamoshida | H01R 4/188 439/877 |
| 2017/0317431 | A1 * | 11/2017 | Kamoshida | H01R 4/188 |
| 2020/0083616 | A1 * | 3/2020 | Kameda | H01R 4/187 |
| 2021/0036440 | A1 | 2/2021 | Kameda et al. | |

FOREIGN PATENT DOCUMENTS

| | | | | | |
|---|---|---|---|---|---|
| JP | 2007-59123 | A | | 3/2007 | |
| JP | 2007059123 | A | * | 3/2007 | |
| JP | 2012-3856 | A | | 1/2012 | |
| JP | 2015-32542 | A | | 2/2015 | |
| JP | 2015-32543 | A | | 2/2015 | |
| JP | 2015100815 | A | * | 6/2015 | |
| JP | 2016-71950 | A | | 5/2016 | |
| JP | 2018-200831 | A | | 12/2018 | |
| JP | 2021-82440 | A | | 5/2021 | |
| WO | WO-2013051096 | A1 | * | 4/2013 | H01B 11/00 |
| WO | WO 2019/167714 | A1 | | 9/2019 | |

OTHER PUBLICATIONS

International Search Report issued Aug. 31, 2021 in PCT/JP2021/025453 filed Jul. 6, 2021, 3 pages.
English translation of International Preliminary Report on Patentability and Written Opinion issued Jan. 10, 2023 in PCT/JP2021/025453, 3 pages.

* cited by examiner

TERMINAL-EQUIPPED ELECTRIC WIRE, WIRING HARNESS, AND METHOD FOR MANUFACTURING TERMINAL-EQUIPPED ELECTRIC WIRE

TECHNICAL FIELD OF THE INVENTION

The present invention relates to a terminal-equipped electric wire and the like that are used in motor vehicles, for example.

BACKGROUND OF THE INVENTION

A wire harness for motor vehicles is a bundle of coated conductive wires in which a conductor is connected with a crimp terminal. The wire harness is often wired as a signal wire inside a vehicle, for example. The common coated conductive wire and the crimp terminal are connected to each other by removing a coating at a tip end of the coated conductive wire, crimping the exposed conductor at a conductive wire crimp part, and crimping a coating at a coating crimp part. At this time, an oxide film of poor conductivity is formed on a surface of the conductor. The oxide film, however, can be broken by strong compression at the time of crimping the conductive wire crimp part. Thus, strands forming the conductor arc in contact with the conductive wire crimp part of the crimp terminal, thereby achieving conduction with the crimp terminal.

However, particularly for wire harnesses used in vehicles, electric wires having smaller diameters than conventional wires are sometimes used for weight reduction, and there has been a demand for electric wires having thin diameters of 0.35 sq (sq: $mm^2$) or less. In a case of using such thin electric wires, there is a problem that tensile strength at a connection part may be significantly lowered because of breaking of the strands, or damages given to the strands, due to excessive compression. However, if less compression is given, the breaking of the oxide film is insufficient as mentioned above, which raises a problem of an increase in resistance at the connection part.

That is, strong compression may damage the strands, which is likely to lower strength at the crimp part; and the weak compression increases the resistance at the crimp part since the compression is insufficient to break the oxide film, and, in addition, the weak compression fails to give enough strength at the crimp part and fall-out due to insufficient crimping occurs. As above, it is difficult, particularly for the coated electric wire having a thin diameter, to control balance between conductivity and tensile strength by varying compression rates only. Thus, a connector that can easily control the balance between conductivity and tensile strength in just one crimping has been awaited.

As a countermeasure, a use of an electric wire including a tension member has been considered. For example, in a case of using an electric wire formed of a conductor having tensile strength of approximately 30 N, to obtain tensile strength of 80 N or more, which is a requirement for an electric wire for motor vehicles, Patent Document 1 has proposed an electric wire including a tension member in which a conductive wire is spirally wound around an outer periphery of the metal or non-metal tension member. Such the electric wire is produced by a method in which a conductor is peeled in stages to expose the tension member and inserted into a sleeve, the tension member is then crimped by a steel-made clamp and further unified as one body by using curable resin such as an adhesive agent, and the conductor part is crimped by an aluminum clamp.

Also, Patent Document 2 has proposed a coated electric wire including a conductor being formed of a plurality of strands that are bundled together, and a fibrous tension member being disposed in valley parts among the strands on an outer periphery side of the conductor and an inner periphery side of a coating material.

RELATED ART

Patent Documents

[Patent Document 1] Japanese Unexamined Utility Model Application Publication No. S61-046827 (JP-UM-A-561-046827)

[Patent Document 2] Japanese Unexamined Patent Application Publication No. 2012-3856 (JP-A-2012-3856)

SUMMARY OF THE INVENTION

Problems to be Solved by the Invention

However, in both Patent Documents 1 and 2, when a coated conductive wire having a large diameter is used and connected to a crimp terminal, for example, crimping at the conductive wire crimp part is possible with a compression rate that can satisfy both the connection strength and the connective resistance. However, if the diameter of the electric wire becomes smaller, a scope of crimping conditions that are appropriate for both the connection strength and the electric resistance becomes smaller. This is because obtaining the sufficient connection strength may cause the conductor to fracture and to have the higher connective resistance, and prioritizing the connective resistance may fail to obtain the connection strength, causing the electric wire to come off. Thus, the smaller the electric wire diameter is, the harder it is to satisfy both the connection strength and the electric resistance.

Also, in Patent Document 1 for example, the tension member is damaged and tensile strength is lowered when the compression rate is low at the time of crimping (i.e., strong compression); and the resistance at the crimp part is increased when the compression rate is high (i.e., weak compression). In particular, when crimping with an open barrel shape, the conductor and the tension member may be disarranged at the time of being crimped, which raises a problem of lowering tensile strength and increasing the resistance at the crimp part. Also, to connect a conventional electric wire including a tension member, peeling in stages and crimping steps for crimping the tension member and the conductive wire are necessary. This increases the number of components and operational steps, which raises cost. In particular, the peeling in stages itself becomes harder as a diameter of the electric wire decreases. As above, Patent Document 1 has problems that manufacturing steps are complex and thus processing cost is high.

Also, Patent Document 2 discloses an example in which strength is improved without impairing electrical properties by providing a fibrous tension member between conductive wires. However, when crimping an electric wire in Patent Document 2, the tension member enters into gaps between the conductive wire and the terminal, and this may increase the resistance at the crimp part. Even if the tension member is a conductor, with a change in temperature, there may be a gap generated between the tension member and the conductor due to a difference in heat expansion rates. Thus, Patent Document 2, similarly to Patent Document 1, cannot solve the problem that the tension member is damaged and tensile strength is lowered when the compression rate is low at the time of crimping, and the resistance at the crimp part is increased when the compression rate is high at the time of crimping.

The present invention is made in view of the above problems. It is an object of the present invention to provide a terminal-equipped electric wire and the like that can achieve an excellent crimping workability and satisfy both connection strength and connective resistance.

Means for Solving Problems

To achieve the above object, a first aspect of the present invention is a terminal-equipped electric wire in which a coated conductive wire and a terminal are electrically connected to each other. The coated conductive wire includes a tension member and a conductive wire that is disposed on an outer periphery of the tension member and is formed of a plurality of conductors. A cross-sectional area of the conductive wire is 0.35 sq or less, and tensile strength of the tension member is greater than tensile strength of the conductor. The terminal includes a conductive wire crimp part and a coating crimp part. The conductive wire being exposed from a coating at a tip end of the coated conductive wire is crimped at the conductive wire crimp part, and the coating of the coated conductive wire is crimped at the coating crimp part. The conductive wire is crimped at the conductive wire crimp part from an entire circumference of a circumferential direction of the conductive wire.

The tension member may include a plurality of strands.

Preferably, a compression rate of the conductive wire is equal to or less than an apparent compression rate of a region on which the tension member is disposed.

The conductive wire may be twisted on the outer periphery of the tension member.

At least a tip end part of the conductive wire may be compressed from an outer periphery side.

The plurality of conductors may be plated.

Preferably, the conductive wire is crimped at the conductive wire crimp part at a predetermined position in an axial direction from the entire circumference.

Preferably, the conductive wire crimp part is not in contact with the tension member.

The cross-sectional area of the conductive wire may be 0.3 sq or less.

According to the first aspect of the present invention, the conductive wire is disposed on an outer periphery part of the tension member in a cross section that is perpendicular to a longitudinal direction of the coated conductive wire. This can make certain that the conductive wire and a conductive wire crimp part are in contact and conductive with each other when the conductive wire is crimped at the conductive wire crimp part. Also, crimping from the entire circumference of the conductive wire at the conductive wire crimp part can eliminate local stress (deformation) applied to the conductive wire at the time of crimping, and, at the same time, can provide a contacting area between the conductive wire and the conductive wire crimp part.

Also, the tension member at the center can improve tensile strength of the conductive wire. At this time, there is no need to connect the tension member and the conductive wire by using separate clamps as in conventional techniques. This reduces the number of components used and facilitates the connection operation.

The above-mentioned effects are particularly effective when using the small-diameter coated conductive wire in which the cross-sectional area of the conductive wire is 0.35 sq or less, or as small as 0.3 sq or less.

Also, since tensile strength of the tension member is greater than that of the conductive wire, deformation of the tension member at the time of compression is suppressed, which can suppress lowering of tensile strength of the electric wire. At this time, if the tension member is formed of a plurality of strands, unevenness is formed at the time of compression on the outer periphery part of the tension member because of the strands. Thus, even with an equal amount of deformation, the conductive wire can deform while a part of the conductive wire enters into the unevenness and this can prevent the conductive wire from being excessively crashed compared to a case in which the conductive wire deforms on an outer periphery surface of one single tension member.

Also, when crimping the conductive wire crimp part, tensile strength of the tension member is strong, and thus the compression rate of the conductive wire can be equal to or less than the apparent compression rate of the region on which the tension member is disposed. This can suppress deformation of the tension member while compressing and deforming the conductive wire with certainty.

Also, if the conductive wire is twisted on the outer periphery of the tension member, disarrangement of the conductive wire can be suppressed.

Similarly, compressing the tip end part of the conductive wire from the outer periphery side to form a processed end part can suppress disarrangement of the conductive wire when inserting the tip end of the conductive wire into the pipe-shaped conductive wire crimp part.

Also, plating a surface of the conductor with conductive metal is effective in improving conductivity and tensile strength. This is also effective in improving workability since disarrangement of the conductor strands is suppressed at the time of crimping operation of the electric wire.

Also, the conductive wire is crimped at the conductive wire crimp part at the predetermined position in the axial direction from the entire circumference. This can suppress local stress applied onto the conductive wire and, at the same time, can provide the contacting area between the conductive wire and the conductive wire crimp part.

Also, crimping in such a way that the conductive wire crimp part is not in contact with the tension member can suppress disarrangement of the conducive wire, thereby ensuring that the conductive wire and the conductive wire crimp part are in contact with each other, and can compress the conductive wire and the tension member with certainty. For example, when crimping with an open-barrel shape with barrel pieces digging into the center part of the cross section, the cross-sectional shape of the electric wire may change drastically, and this inhibits lowering of both the compression rate of the conductive wire and the compression rate of the tension member, which makes it difficult to achieve the desired performance. Also, by not letting the conductive wire crimp part come into contact with the tension member, the tension member can be prevented from getting damaged by the conductive wire crimp part.

A second aspect of the present invention is a wire harness in which a plurality of terminal-equipped electric wires, including the terminal-equipped electric wire according to the first aspect of the present invention, are unified together as one body.

According to the second aspect of the present invention, the wire harness, which is a bundle of a plurality of small-diameter electric wires, can be obtained.

A third aspect of the present invention is a method for manufacturing the terminal-equipped electric wire according to the first aspect of the present invention. The method includes crimping the conductive wire crimp part. Both the compression rate of the conductive wire and the apparent compression rate of the tension member are lowered in an early stage of compression, and by compressing further, reduction in the apparent compression rate of the tension member becomes relatively small while reduction in the compression rate of the conductive wire progresses mainly.

According to the third aspect of the present invention, the coated conductive wire and the terminal can be easily crimped together through the steps that are similar to those used for conventional terminal-equipped electric wires. For example, although both the compression rates of the tension member and the conductive wire are reduced simultaneously at the early stage of the compression, the tension member reaches compression limit first with no further reduction in the compression rate, which may likely to generate a difference between the compression rates of the tension member and the conductive wire. In such crimping where there is a difference in the compression rates, the compression rate of the tension member can be maintained high while it is possible to reduce the compression rate of the conductive wire. Thus, such the crimping is particularly effective for the conductive wire that needs strong crimping to lower the crimp part resistance. Note that even if the compression rates of the tension member and the conductive wire are equal, such the crimping never crashes the tension member excessively and can achieve higher tensile strength than conventional techniques.

Effects of the Invention

The present invention can provide a terminal-equipped electric wire and the like that can achieve an excellent crimping workability and satisfy both connection strength and connective resistance.

DESCRIPTION OF SOME EMBODIMENTS

First Embodiment

Figure 1:
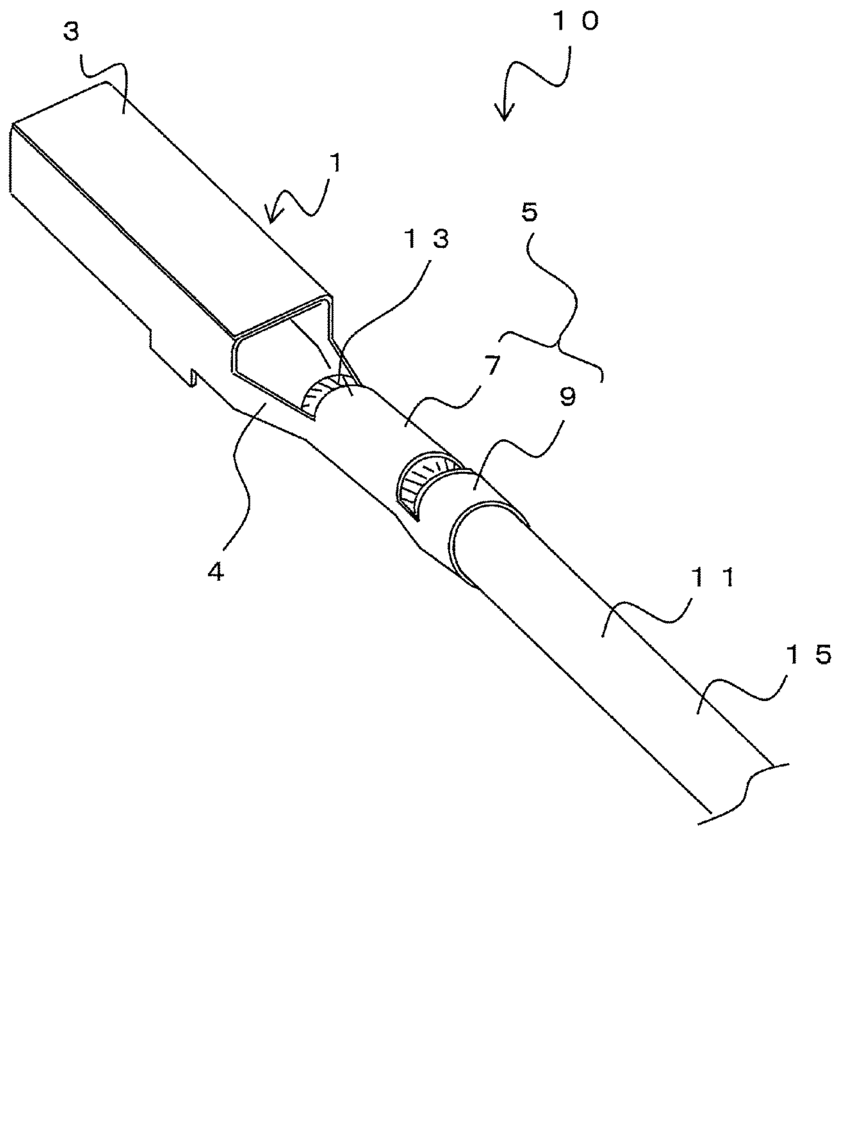
FIG. 1 is a perspective view showing a terminal-equipped electric wire 10.
Figure 2A:
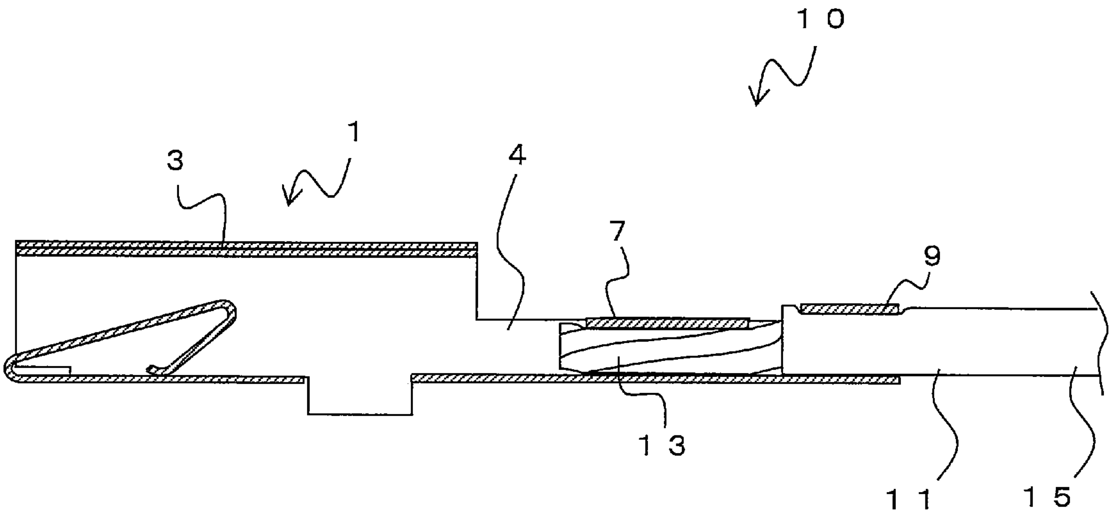
FIG. 2A is a cross-sectional view taken along an axial direction showing the terminal-equipped electric wire 10.
Figure 2B:
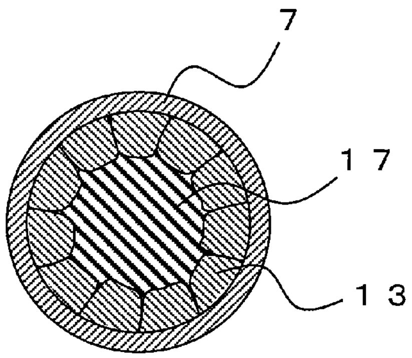
FIG. 2B is a cross-sectional view taken along a diameter direction at a conductive wire crimp part 7.

Hereinafter, an embodiment of the present invention will be described with reference to the accompanying drawings. FIG. 1 is a perspective view showing a terminal-equipped electric wire 10, and FIG. 2A is a cross-sectional view of the terminal-equipped electric wire 10 taken along an axial direction, and FIG. 2B is a cross-sectional view of the terminal-equipped electric wire 10 taken along a diameter direction at a conductive wire crimp part 7. The terminal-equipped electric wire 10 includes a terminal 1 and a coated conductive wire 11 that are electrically connected to each other.

The coated conductive wire 11 is formed of a conductive wire 13, which is made of copper, copper alloy metal, aluminum, or aluminum alloy metal, for example, and a coating 15, which coats the conductive wire 13. That is, the coated conductive wire 11 includes the coating 15 and the conductive wire 13 being exposed from a tip end of the coating 15.

The terminal 1 is made of copper, copper alloy metal, aluminum, or aluminum alloy metal, for example. The coated conductive wire 11 is connected to the terminal 1. The terminal 1 is formed of a terminal body 3 and a crimp part 5 that are joined together via a transition part 4.

The terminal body 3 is made by forming a predetermined shaped plate-like material into a tubular body having a rectangular cross section. The terminal body 3 includes an elastic contacting piece that is formed by folding the plate-like material into the rectangular tubular body. A male terminal or the like is inserted from a front-end part of the terminal body 3 to be connected. In the descriptions hereinafter, examples in which the terminal body 3 is a female-type terminal allowing an insertion tab of a male-type terminal etc., of which illustrations are omitted, to be inserted. However, detail shapes of the terminal body 3 in the present invention are not particularly limited. For examples, instead of the female-type terminal body 3, an insertion tab of a male-type terminal may be provided, or, alternatively, a bolt fastening part such as a ring terminal may be provided.

The crimp part 5 of the terminal 1 is a part to which the coated conductive wire 11 is crimped. The crimp part 5 includes a conductive wire crimp part 7 that crimps the conductive wire 13 exposing from the coating 15 at a front-end side of the coated conductive wire 11, and a coating crimp part 9 that crimps the coating 15 of the coated conductive wire 11. That is, the conductive wire 13 being exposed by peeling the coating 15 is crimped by the conductive wire crimp part 7, thereby electrically connecting the conductive wire 13 and the terminal 1 with each other. Also, the coating 15 of the coated conductive wire 11 is crimped by the coating crimp part 9 of the terminal 1. In the present embodiment, each of the conductive wire crimp part 7 and the coating crimp part 9 is formed in a pipe shape being closed in a circumferential direction (in a substantially cylindrical shape).

Although illustrations are omitted, serrations may be provided in a width direction (a direction perpendicular to a longitudinal direction) at a part of an inner surface of the conductive wire crimp part 7. The serrations formed in this way can easily break an oxide film on a surface of the conductive wire 13, and also can increase a contacting area with the conductive wire 13 at the time of crimping the conductive wire 13.

As shown in FIG. 2B, the coated conductive wire 11 includes a tension member 17, which is disposed at a substantially center of a cross section, and the conductive wire 13, which is formed of a plurality of conductors disposed on an outer periphery of the tension member 17. The tension member 17 is a member that receives tensile force when a tensile load is applied. Although details will be described below, the tension member 17 includes a plurality of strands. Also, on the outer periphery of the tension member 17, the conductive wire 13 may be spirally twisted together along the longitudinal direction of the coated conductive wire 11. At this time, the each conductive wire 13 (strands) disposed on the outer periphery of the tension member 17 may have the same cross-sectional area and the same shape. For the conductive wire 13, annealed copper wires, hard-drawn copper wires, copper alloy metal wires, aluminum wires, or aluminum alloy metal wires may be used, for example. However, in a viewpoint of electrical conductivity, annealed copper wires are preferable.

As mentioned above, the conductive wire crimp part 7 is in a pipe shape. Thus, at a predetermined position (in a cross section at the predetermined position) in an axial direction of the conductive wire crimp part 7, the conductive wire 13 can be crimped by the conductive wire crimp part 7 from the entire 360° circumference thereof. That is, the conductive wire 13 is crimped at the conductive wire crimp part 7 from an entire circumference of a circumferential direction of the conductive wire 13. Thus, an inner surface of the conductive wire crimp part 7 is in contact with the conductive wire 13 over the entire circumference, which can prevent the conductive wire 13 from being applied with local stress (deformation) at the time of crimping.

Here, the present invention is particularly effective when a cross-sectional area of the conductive wire 13 (a total of cross-sectional areas of the strands) is 0.35 sq or less. That is, the terminal 1 can crimp the conductive wire 13 having the cross-sectional area of 0.35 sq or less. Furthermore, the cross-sectional area of the conductive wire 13 (the total of cross-sectional areas of the strands) is preferably 0.3 sq or less, and, in such the case, it is preferable that the terminal 1 can crimp the conductive wire 13 having the cross-sectional area of 0.3 sq or less. Also, the conductive wire 13 is used together with the tension member 17, and thus the cross-sectional area of the conductive wire 13 may be 0.05 sq or less. Smaller the cross-sectional area of the conductive wire 13 is, the larger the effects of the present embodiment. From a viewpoint of obtaining sufficient crimp strength, the cross-sectional area of the conductive wire 13 is preferably 0.01 sq or more, and more preferably 0.03 sq or more.

The tension member 17 is formed of the plurality of strands, which may be made of metal such as steel, resin, or fiber-reinforced resin. Example for the strands forming the tension member 17 include polyparaphenylene benzobis oxazole (PBO) fibers, aramid fibers, carbon steel wires, stainless steel wires, liquid-crystal polyester fibers, glass fibers, and carbon fibers. However, when considering anti-corrosion property, non-metal wires are preferable.

Also, it is preferable that tensile strength of the tension member 17 is greater than tensile strength of the conductive wire 13. The tensile strength is defined as the maximum stress before breaking while being applied with tensile stress. However, in the present embodiment, tensile strength is regarded as a relative index of tendency to break due to crashing of a material when crimped. That is, compared to the conductive wire 13, the tension member 17 is made of a material that is more unlikely to deform by crimping. Furthermore, it is preferable that a Young's modulus of the tension member 17 is greater than that of the conductive wire 13, and yield stress (or proof stress) of the tension member is greater than that of the conductive wire 13.

Figure 3:
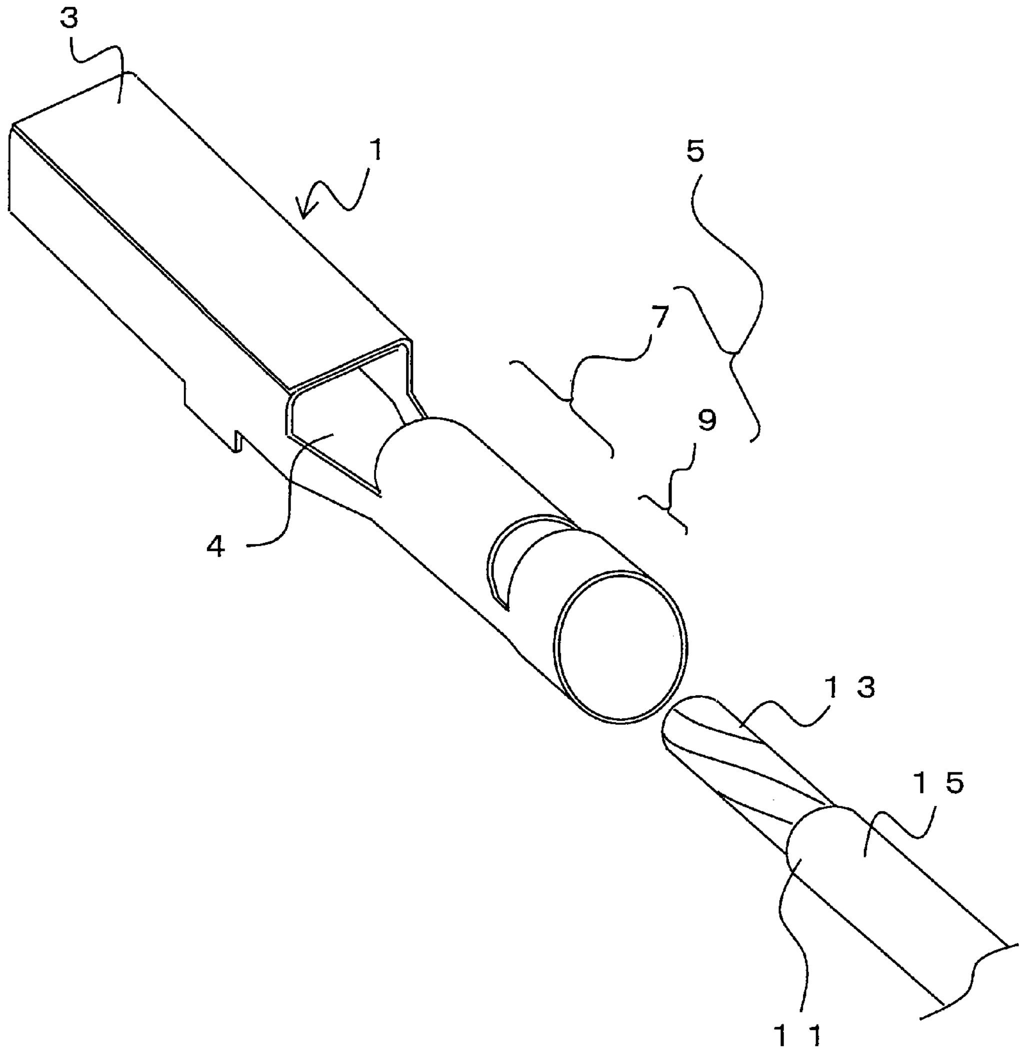
FIG. 3 is a view showing a terminal 1 and a coated conductive wire 11.

Next, a method for producing the terminal-equipped electric wire 10 will be described. FIG. 3 is a perspective view showing the terminal 1 and the coated conductive wire 11 before crimping. As mentioned above, the terminal 1 includes the terminal body 3 and the crimp part 5. The crimp part 5 includes the conductive wire crimp part 7 and the coating crimp part 9 that are formed as one body in a substantially cylindrical shape. The crimp part 5 may be formed by rolling a plate member, butting end parts thereof to each other, and joining the end parts by welding or brazing in the longitudinal direction, and the terminal 1 may be formed by developing a tube-shaped member. Although the conductive wire crimp part 7 and the coating crimp part 9 may have the same diameter, an inner diameter of the coating crimp part 9 may be larger than the inner diameter of the conductive wire crimp part 7 as shown in the drawing.

Figure 4A:
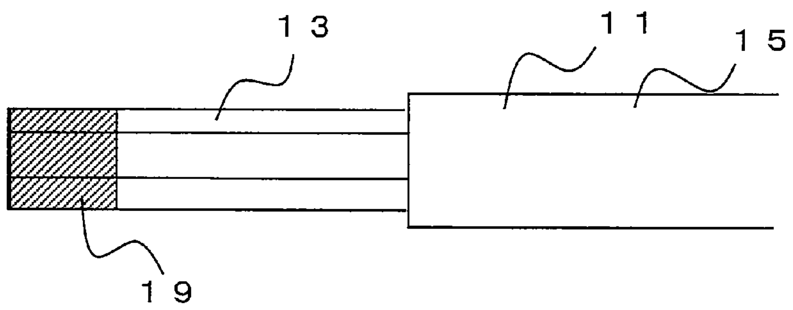
FIG. 4A is a view showing a tip end part of a conductive wire 13.

First, as mentioned above, the coating 15 at the tip end part of the coated conductive wire 11 is peeled off to expose the conductive wire 13 at the tip end part. Next, as shown in FIG. 4A, a processed end part 19 may be formed at the tip end part of the conductive wire 13 before being inserted into the crimp part 5 of the terminal 1. The processed end part 19 is a processed part in which the strands of the conductive wire 13 are unified so as not to be separated from one another.

Figure 4B:
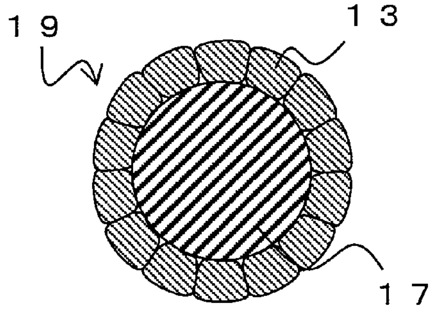
FIG. 4B is a view showing a form of a processed end part 19.

As mentioned above, the tension member 17 is disposed at the substantially center and the conductive wire 13 is disposed on the outer periphery of the tension member 17. The conductive wire 13 is formed of the plurality of strands. In such the case, as shown in FIG. 4B, the processed end part 19 can be formed by compressing at least the tip end part of the conductive wire 13 from the outer periphery side. Compressing the tip end part of the conductive wire 13 from the outer periphery side in this way can prevent the strands from separating from one another and facilitate the insertion of the conductive wire 13 into the pipe-shaped crimp part 5.

Figure 4C:
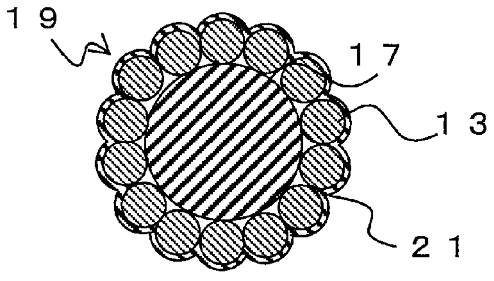
FIG. 4C is a view showing a form of the processed end part 19.

Also, as shown in FIG. 4C, the processed end part 19 may be formed by collectively plating at least the tip end part of the conductive wire 13, forming a plating layer 21. Plating collectively the tip end part of the conductive wire 13 from the outer periphery in this way can prevent the strands from separating from one another and facilitate the insertion of the conductive wire 13 into the pipe-shaped crimp part 5.

Note that, when plating collectively the tip end part of the conductive wire 13 from the outer periphery, some of the plating methods may cause a temperature rise. If the collective plating is performed on the twisted conductive wire 13 using such the plating method, the heat may deteriorate the tension member 17, which may lower tensile strength.

Figure 4D:
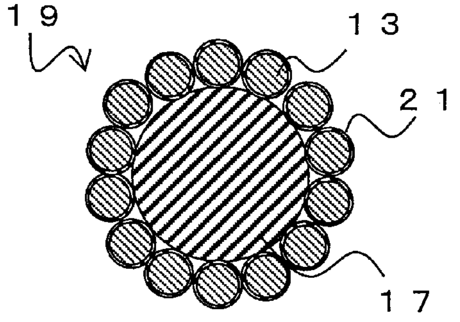
FIG. 4D is a view showing a form of the processed end part 19.
Figure 5:
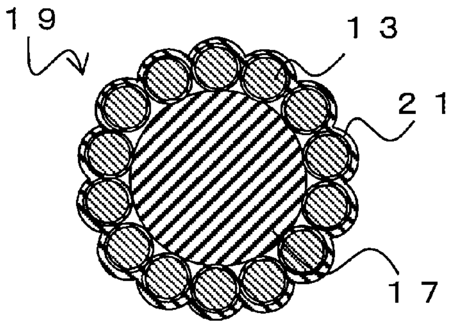
FIG. 5 is a view showing another form of a processed end part 19.

In such the case, as shown in FIG. 4D, the plating layer 21 may be formed for each of the conductors, which are then twisted together on the outer periphery of the tension member 17. Alternatively, as shown in FIG. 5, the plating layer 21 may be formed for each of the conductors, and then the collective plating process may be further performed on the tip ends of the plurality of conductors from the outer periphery. In such the case, types of plating for the individual conductors and the collective plating may be different. As mentioned above, the collective plating enables to prevent separation of the conductors. However, when the bundled conductors are plated collectively, there may be partial variations in thickness of the plating caused by shapes or the like of the conductors. The advance preparatory plating for the individual conductor, on the other hand, can reduce such influence, allowing the collective plating to be substantially uniform.

The method for end processing the processed end part 19 is not limited to compression or plating. For example, soldering or welding the tip end of the conductive wire 13 may be used to prevent separation of the strands. Also, a plurality of end processing methods may be used at the same time, e.g., both compression from the outer periphery and the collective plating.

Next, the coated conductive wire 11 with the tip end part being processed as above is inserted into the pipe-shaped crimp part 5 of the terminal 1 from the rear-end side thereof. When the tip end part of the coated conductive wire 11 is inserted into the crimp part 5, the exposed part of the conductive wire 13 is positioned inside the conductive wire crimp part 7, and the coating 15 is positioned inside the coating crimp part 9. At this time, the tip end of the conductive wire 13 may come out of a front end of the conductive wire crimp part 7.

Figure 6A:
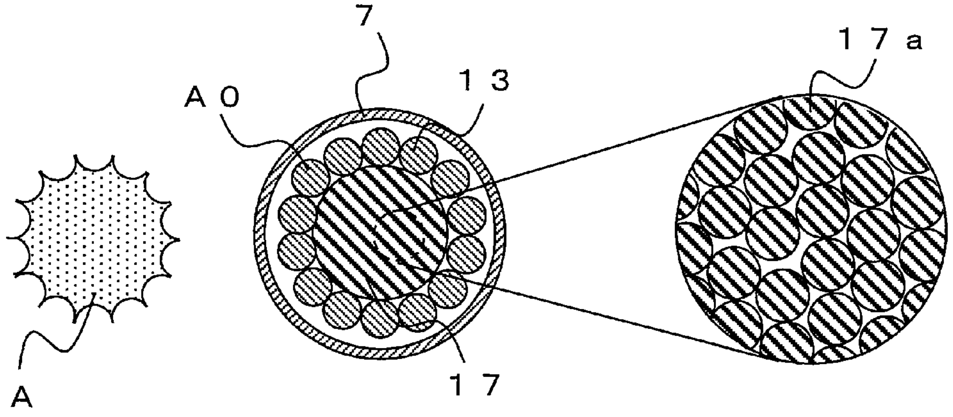
FIG. 6A is a schematic view showing changes in the conductive wire crimp part 7 during a crimping process.

In FIG. 6A, a view in the middle shows a schematic cross-sectional view taken at the conductive wire crimp part 7 before crimping, a view on the left shows a shape of a region of the tension member 17, and a view on the right is an enlarged view of the region of the tension member 17. As mentioned above, the tension member 17 is formed by bundling together a plurality of tension member strands 17*a*. The conductive wire 13 is disposed on an outer periphery of the tension member strands 17*a*.

The cross-sectional area of the conductive wire 13 before crimping is the total of the cross-sectional areas of all the conductors, which is also a product standard of the coated conductive wire 11, and the total cross-sectional area can be calculated relatively easily by image analysis of the cross section. On the other hand, each of the tension member strands 17*a* is thin compared to the conductors forming the conductive wire 13, and it is difficult to clearly distinguish the tension member strands 17*a* from spaces between the tension member strands 17*a*. For this reason, an area of a region of the tension member surrounded by the conductive wire 13 (A in FIG. 6A) is taken as the cross-sectional area of the tension member 17 before crimping.

Figure 6B:
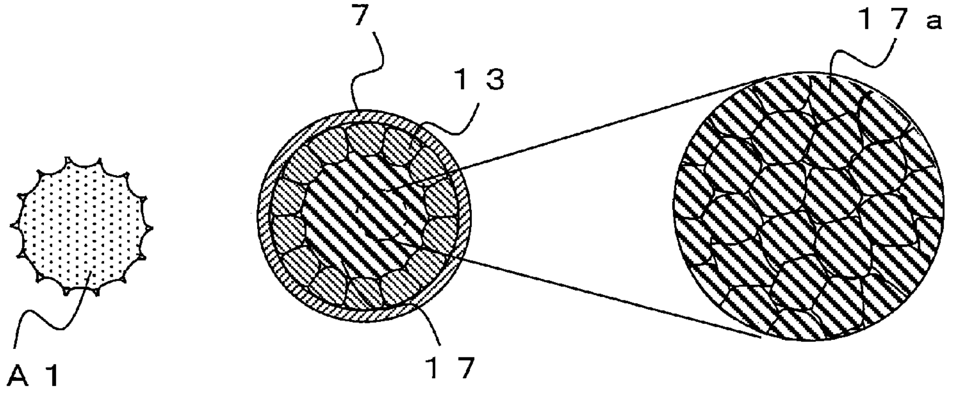
FIG. 6B is a schematic view showing changes in the conductive wire crimp part 7 during the crimping process.

FIG. 6B illustrates views corresponding to FIG. 6A in the midst of compression. When the compression starts, deformation of the conductive wire 13 and the tension member strands 17*a* progresses. At this time, in early stages of deformation, although there is not much change in the total cross-sectional area of the tension member strands 17*a*, the spaces between the tension member strands 17*a* arc reduced. Thus, an apparent cross-sectional area of the region of the tension member 17 (A1 in FIG. 6B) is reduced. That is, when crimping the conductive wire crimp part 7, in early stages of the compression, both a compression rate of the conductive wire 13 due to deformation and an apparent compression rate of the tension member 17 are lowered.

Figure 6C:
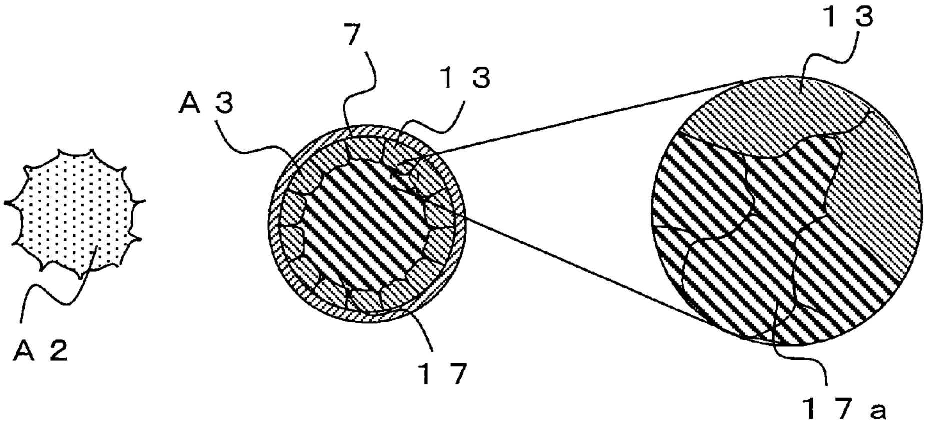
FIG. 6C is a schematic view showing changes in the conductive wire crimp part 7 during the crimping process.

FIG. 6C illustrates views corresponding to FIG. 6A after crimping is completed. As mentioned above, the tension member strands 17*a* have greater strength than the conductive wire 13 and are not easily deformed. Thus, after the spaces are reduced, deformation of the conductive wire 13 (reduction in the cross section) mainly progresses with very little reduction in the cross-sectional area of the tension member 17 (A2 in FIG. 6C). Note that the apparent cross-sectional area of the tension member 17 after compression is calculated by subtracting the cross-sectional area of the conductive wire 13 from a cross-sectional area of an inside of the conductive wire crimp part 7. As above, by compressing further from the state shown in FIG. 6B, reduction in the apparent compression rate of the tension member 17 becomes relatively small while reduction in the compression rate of the conductive wire 13 progresses mainly.

Here, the compression rate of the conductive wire 13 after crimping is equal to or less than the apparent compression rate of the region on which the tension member 17 is disposed. The compression rate of the conductive wire 13 is A3/A0 (%), wherein A0 refers to the total cross-sectional area of the conductive wire 13 before the crimping process (FIG. 6A) and A3 refers to the total cross-sectional area of the conductive wire 13 after compression (FIG. 6C). Also, the apparent compression rate of the region on which the tension member 17 is disposed is A2/A (%), wherein A refers to the cross-sectional area of the tension member region before the crimping process (FIG. 6A) and A2 refers to the cross-sectional area of the tension member region after compression (FIG. 6C). Thus, A3/A0 is equal to or less than A2/A. Note that an area ratio of the conductive wire 13 to the tension member 17 (A3/A2) after compression varies depending on the compression rate of the entire electric wire.

As mentioned above, the conductive wire 13 is crimped at the conductive wire crimp part 7 from the entire circumference of the circumferential direction of the conductive wire 13. Also, as shown in FIG. 6C, the tension member 17 is formed of the plurality of tension member strands 17*a*, and thus there is unevenness formed on the outer periphery of the tension member 17 (the region). Thus, on an interface between the tension member 17 and the conductive wire 13, the conductive wire 13 deforms according to the unevenness due to the tension member strands 17*a*. The unevenness of the outer shape of the tension member 17 increases contacting areas between the conductive wire 13 and the tension member 17, thereby increasing frictional force. For this reason, when being pulled, force can be easily transmitted from the conductive wire 13 to the tension member 17 and this is expected to increase strength when a pulling force is applied to the conductive wire 13.

For example, if the tension member 17 is a single wire, the interface between the conductive wire 13 and the tension member 17 is almost flat and smooth. At this time, since the tension member 17 is unlikely to deform compared to the conductive wire 13, the conductive wire 13 deforms being crashed along the surface of the tension member 17. This may cause the conductive wire 13 to become too thin and break. By contrast, if there is unevenness formed on the outer periphery surface of the tension member 17, the conductive wire 13 can deform as to be fitted into such unevenness, and this can prevent the conductive wire 13 from being excessively crashed and broken.

Since an amount of deformation of the tension member 17 (the tension member strands 17*a*) is small compared to that of the conductive wire 13, fracture of the tension member 17 due to the reduction in the cross-sectional area is unlikely to occur. In particular, the tension member 17 does not suffer damages since the conductive wire crimp part 7 is in a pipe shape and the conductive wire 13 is compressed from the entire periphery, and the conductive member 13 is disposed between the tension member 17 and the conductive wire crimp part 7 and the tension member 17 and the conductive wire crimp part 7 are not in contact with each other.

Figure 7:
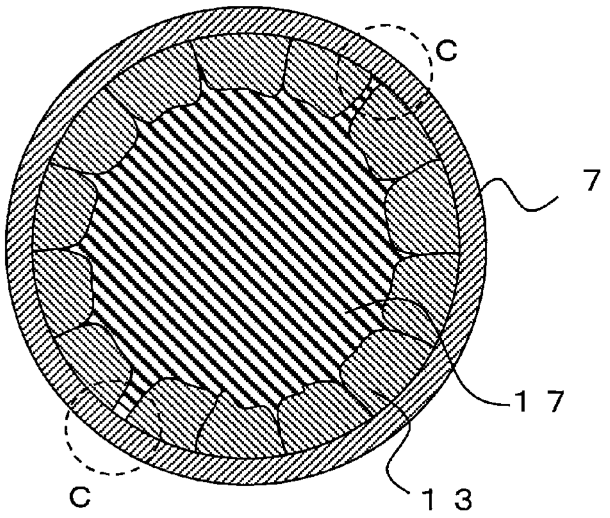
FIG. 7 is a schematic view showing the conductive wire crimp part 7 after crimping.

As shown in FIG. 7, there are some cases in which the tension member 17 (the tension member strands 17*a*) enters into the conductive wire 13 and a part of the tension member 17 comes into contact with the conductive wire crimp part 7 (C section in the drawing). As mentioned above, although it is preferable that the tension member 17 and the conductive wire crimp part 7 are not in contact with each other, the part of the tension member 17 may slightly be in contact with the conductive wire crimp part 7 as illustrated. For example, damage prevention effects for the tension member 17 can be obtained if, on any cross sections, a circumferential length of the tension member 17 that is in contact with the conductive wire crimp part 7 is 30% or less of the entire outer circumferential length of the tension member 17.

Accordingly, the terminal-equipped electric wire 10 can be obtained. Furthermore, a wire harness in which a plurality of terminal-equipped electric wires, including the terminal-equipped electric wire 10 obtained as above, are unified together as one body can be obtained.

As described above, according to the present embodiment, the conductive wire 13 is crimped at the conductive wire crimp part 7 from the entire 360° circumference, and this can prevent local stress (deformation) applied to the conductive wire 13 at the time of crimping. It is also possible to perform the crimping without greatly altering the structure in which the tension member 17 is disposed in the middle and the conductive wire 13 is twisted around the tension member 17. Also, since the conductive wire crimp part 7 is in contact with the entire circumference of the conductive wire 13, deterioration in resistance can be prevented.

Also, since tensile strength of the tension member 17 is greater than that of the conductive member 13, further stronger crimping can be performed. That is, the strong crimping does not damage the tension member 17, and this can prevent fracture of the coated conductive wire 11 at the conductive wire crimp part 7. Also, with the strong crimping, the oxide film of the conductive wire 13 can be broken and thus the conductive wire 13 and the terminal 1 can be in close contact with each other with more certainty. Thus, both the low resistance and the high tensile strength at the crimp part can be achieved. For this reason, the present invention is particularly effective for thin electric wires of 0.35 sq or less.

Also, since the tension member 17 is formed of the tension member strands 17*a*, in the early stages of crimping, deformation of the conductive wire 13 and deformation by reducing the spaces between the tension member strands 17*a* progress. Thus, compression force is not applied only to the conductive wire 13 and the conductive wire 13 is moderately deformed by compression. Also, unevenness is formed on the outer periphery surface of the tension member 17 and the conductive wire 13 deforms being fitted along the unevenness shape, which prevents excessive crashing of the conductive wire 13.

At the conductive wire crimp part 7, the terminal 1 (the conductive wire crimp part 7) is crimped to the conductive wire 13 inside, and the conductive wire 13 is crimped to the tension member 17 (the tension member strands 17*a*) inside. At this time, if there is a sufficient amount of compression in the conductive wire crimp part 7, frictional force between the terminal 1 (the conductive wire crimp part 7) and the conductive wire 13 and frictional force between the conductive wire 13 and the tension member 17 (the tension member strands 17*a*) are both sufficient, which can achieve high pull-out force. On the other hand, if the amount of compression is insufficient, while it is relatively easy to achieve the friction force between the terminal 1 (the conductive wire crimp part 7) and the conductive wire 13, it is difficult to achieve the sufficient frictional force between the conductive wire 13 and the tension member 17 (the tension member strands 17*a*), which makes it difficult to obtain the high pull-out force. Thus, it is preferable to obtain a sufficiently large amount of compression (a low compression rate) at the conductive wire crimp part 7 within a scope that the conductive wire 13 does not break.

Furthermore, in a case, like the present embodiment, in which the conductive wire crimp part 7 is in a tubular shape having the joint part being brazed, the compression stress onto the conductive wire 13 is small at the brazed part where hardness is low and thus the tension member 17 is likely to be pulled out. Thus, it is preferable to eliminate the brazed part, or, alternatively, the joint part formed on the conductive wire crimp part 7 preferably has no brazed part and has the same hardness as the material used for the conductive wire crimp part 7.

Second Embodiment

Figure 8:
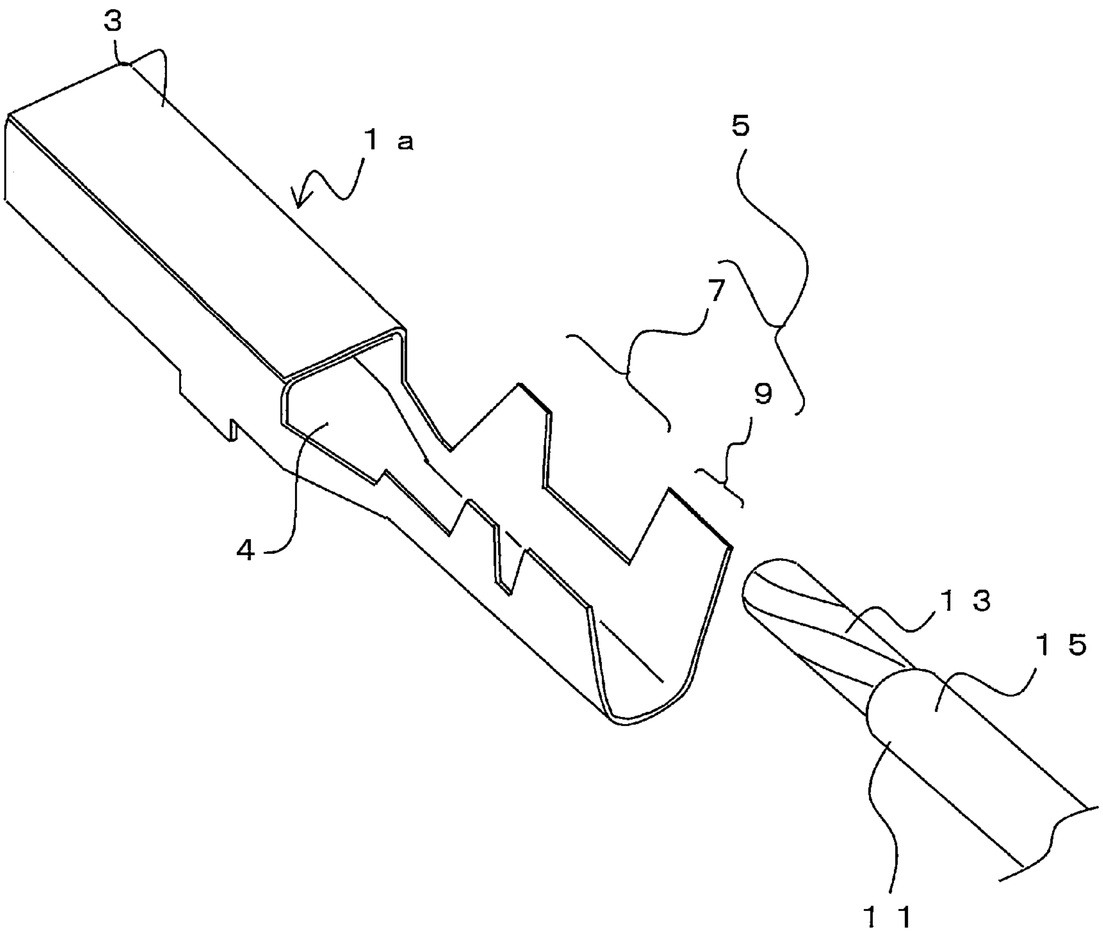
FIG. 8 is a view showing a terminal 1*a* and the coated conductive wire 11 before crimping.

Next, a second embodiment will be described. FIG. 8 is a perspective view of a terminal 1*a* according to the second embodiment before crimping the coated conductive wire 11. In the descriptions below, the same notations used in FIG. 1 to FIG. 6C will be used for the structures having the same functions as in the first embodiment, and redundant descriptions will be omitted.

Figure 9A:
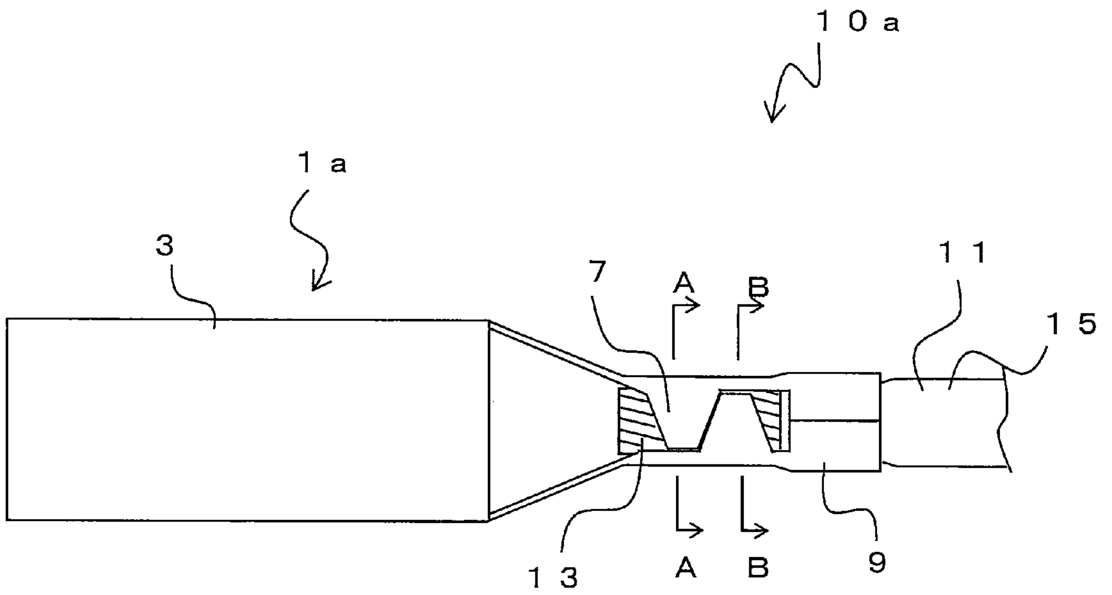
FIG. 9A is a plan view showing a terminal-equipped electric wire 10*a*.

The terminal 1*a* has approximately the same configuration as the terminal 1 except that the crimp part 5 is an open-barrel type. The terminal 1*a* can be crimped similarly as the terminal 1. FIG. 9A is a plan view showing a terminal-equipped electric wire 10*a* in which the terminal 1*a* and the coated conductive wire 11 are crimped.

Here, at the open-barrel type conductive wire crimp part 7, at least a pair of facing barrel pieces are folded to crimp the conductive wire 13. At this time, in the present embodiment, the barrel pieces facing each other are arranged in a zigzag, being shifted from each other in regard to an axial direction of the conductive wire crimp part 7. At the coating crimp part 9, facing barrel pieces may be butted against each other, or, similarly to the conductive wire crimp part 7, barrel pieces may be shifted from each other in regard to an axial direction thereof.

In general, such the open-barrel type crimp part having the barrel pieces arranged in a zigzag prevents a crimping target from being damaged, and enables to bring the barrel pieces and the crimping target in close contact to be crimped together with certainty.

Figure 9B:
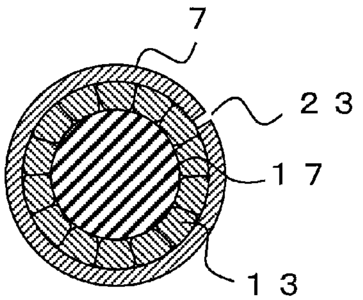
FIG. 9B is a cross sectional view taken along A-A line in FIG. 9A.
Figure 9C:
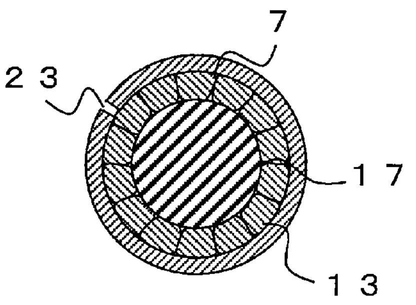
FIG. 9C is a cross sectional view taken along B-B line in FIG. 9A.

However, crimping by zigzag-arranged barrel pieces may not completely crimp the outer periphery of the conductive wire 13 over the entire circumference. FIG. 9B is a cross-sectional view taken along A-A line in FIG. 9A, and FIG. 9C is a cross-sectional view taken along B-B line in FIG. 9A. As shown in FIG. 9B and FIG. 9C, on the cross section at the predetermined position of the axial direction of the conductive wire crimp part 7, there is a gap 23, which is not crimped by the conductive wire crimp part 7, formed at a part of the circumferential direction.

However, even in such the case, the gaps 23 are not aligned along the axial direction of the conductive wire crimp part 7 but are formed at different positions of the circumferential direction in the cross-sectional positions, respectively. Thus, it can be said that the conductive wire 13 is always crimped over the entire circumference of the circumferential direction at some positions of the axial direction of the conductive wire crimp part 7. For example, the position of the circumferential direction of the gap 23 in FIG. 9B is crimped at the conductive wire crimp part 7 in the cross-sectional position in FIG. 9C, and the position of the circumferential direction of the gap 23 in FIG. 9C is crimped at the conductive wire crimp part 7 in the cross-sectional position in FIG. 9B. In this way, the entire circumference of the circumferential direction of the conductive wire 13 may be crimped at some positions of the conductive wire crimp part 7.

As above, the same effects as in the first embodiment etc. can be obtained if the crimp part 5 at the conductive wire crimp part 7 is an open-barrel type. In addition, with the open-barrel type crimp part 5, disposing the conductive wire 13 onto the crimp part 5 is easy.

As above, if it is possible to make certain that the conductive wire 13 is compressed from the entire circumference at the conductive wire crimp part 7, the conductive wire crimp part 7 may be in a shape other than a pipe shape. Also, with the open-barrel type conductive wire crimp part 7, instead of the zigzag arrangement, the barrel pieces may be disposed at the positions such that the barrel pieces face each other at the same position along the axial direction of the conductive wire crimp part 7.

Figure 10A:
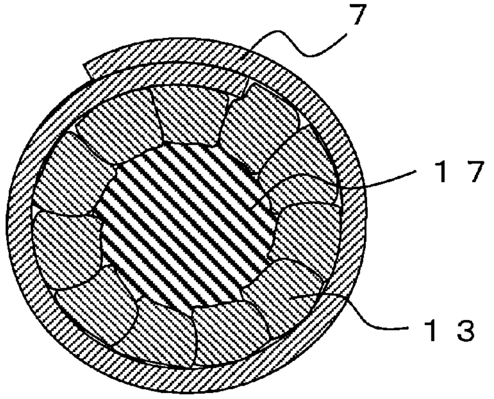
FIG. 10A is another cross-sectional view taken along the diameter direction at the conductive wire crimp part 7.

For example, FIG. 10A is a cross-sectional view showing an example of crimping at the open-barrel type conductive wire crimp part 7, where the barrel pieces are disposed at positions facing each other. In the example illustrated in FIG. 10A, the barrel pieces are disposed at the positions so that the barrel pieces face each other at the same position along the axial direction of the conductive wire crimp part 7, and the barrel pieces are crimped overlapping each other. That is, the facing barrel pieces are overlapped and crimped as if one of the barrel pieces wraps up the other barrel piece.

Figure 10B:
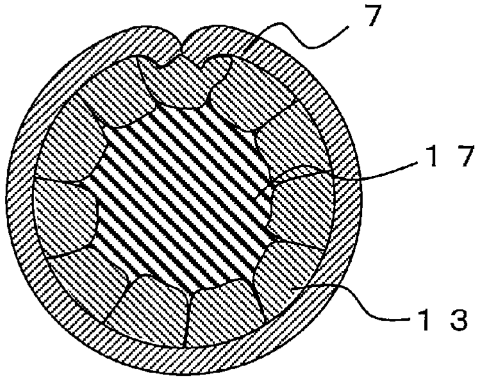
FIG. 10B is another cross-sectional view taken along the diameter direction at the conductive wire crimp part 7.
Figure 10C:
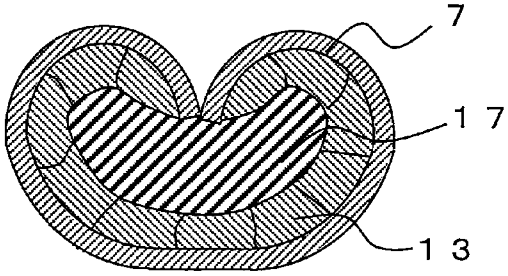
FIG. 10C is another cross-sectional view taken along the diameter direction at the conductive wire crimp part 7.

Also, as shown in FIG. 10B, edges of the barrel pieces that are disposed at positions facing each other may be butted against each other. In such the case, if the edges of the barrel pieces dig inside and come into contact with the tension member 17 as shown in FIG. 10C, arrangement of the conductive wire 13 may be disturbed and the tension member 17 may fracture, which is not preferable. Thus, although the open-barrel type conductive wire crimp part can crimp the conductive wire 13 from the entire circumference, it is still preferable not to let the barrel pieces from digging deep inside to be in contact with the tension member 17.

WORKING EXAMPLES

Various types of terminal-equipped electric wires are produced, and electrical properties (electric resistance performance) and mechanical properties (Tensile Strength Performance) as well as anticorrosion properties of the crimp part are evaluated. The coated conductive wire in which the tension member is disposed at the center of the cross section and the conducive wires are twisted together around the outer periphery is used in all cases. As the electrical property, an electric resistance between the terminal and the coated conductive wire is measured and evaluated. As the mechanical property, the coated conductive wire is pulled out from the terminal and a load at the time when the coated conductive wire is pulled out is measured as a tensile strength. Also, Anticorrosion Performance is evaluated by salt-water spraying tests. Materials used are shown in Table 1, and conditions and results of the evaluation are shown in Table 2 to Table 10.

TABLE 1

| | Material | Material Examples (Composition, Product Name, etc.) | Tensile Strength [MPa] |
|---|---|---|---|
| Tension Member | PBO Fiber | ZYLON ®250D (Toyobo.Co., Ltd) | 4400 |
| | Aramid Fiber | Technora ® (TEIJIN LIMITED) | 3100 |
| | Carbon Fiber | T-700C (Toray Industries, Inc.) | 1650 |
| | Stainless | NAS301H (Nippon Seisen Co., Ltd) | 3000 |
| | Liquid Crystal Polyester | Zxion ® (KB SEIREN, LTD) | 3600 |
| | Nylon | CM1017 (Toyobo.Co., Ltd) | 40 |
| Conductive Wire | Annealed Copper Wire | Tough Pitch Copper Wire (FURUKAWA ELECTRIC CO., LTD) | 234 |
| | Hard-drawn Copper Wire | Tough Pitch Copper Wire (FURUKAWA ELECTRIC CO., LTD) | 361 |
| | 0.15Sn Copper Wire | 0.15% Sn Copper Alloy Wire (FURUKAWA ELECTRIC CO., LTD) | 550 |
| | 0.3Sn Copper Wire | 0.3% Sn Copper Alloy Wire (FURUKAWA ELECTRIC CO., LTD) | 580 |
| | 0.7Sn Copper Wire | 0.7% Sn Copper Alloy Wire (FURUKAWA ELECTRIC CO., LTD) | 700 |
| | Aluminum Wire | ECAL AA-1070 (PT. Tembaga Mulia Semanan ,Tbk.) | 70 |
| | Aluminum Alloy Wire | MSAL (PT. Tembaga Mulia Semanan ,Tbk.) | 185 |
| | Corson Alloy Wire | EFTEC-98W (FURUKAWA ELECTRIC CO., LTD) | 1100 |
| Terminal | Corson Alloy Plate | FAS-680 (FURUKAWA ELECTRIC CO., LTD) | 650 |

TABLE 2

| | Working Example 1 | Working Example 2 | Working Example 3 | Working Example 4 | Working Example 5 | Working Example 6 |
|---|---|---|---|---|---|---|
| Cross Sectional Area of Electric Wire | 0.05 sq | 0.05 sq | 0.05 sq | 0.05 sq | 0.05 sq | 0.05 sq |
| Conductive Wire Material | Annealed Copper Wire | Annealed Copper Wire | Annealed Copper Wire | Annealed Copper Wire | Annealed Copper Wire | Annealed Copper Wire |
| Tensile Strength of Conductive Wire Material (MPa) | 234 | 234 | 234 | 234 | 234 | 234 |

TABLE 2-continued

| | Working Example 1 | Working Example 2 | Working Example 3 | Working Example 4 | Working Example 5 | Working Example 6 |
|---|---|---|---|---|---|---|
| Tension Member | PBO Fiber | PBO Fiber | PBO Fiber | Aramid Fiber | Carbon Fiber | Liquid Crystal Polyester Fiber |
| Tensile Strength of Tension Member (MPa) | 4400 | 4400 | 4400 | 3100 | 1650 | 3600 |
| Process for Conductive Wire | Tin Plated | Tin Plated | Tin Plated | Tin Plated | Tin Plated | Tin Plated |
| Terminal Shape | Pipe | Pipe | Pipe | Pipe | Pipe | Pipe |
| Conductor Compression Rate (%) | 60 | 75 | 40 | 60 | 60 | 60 |
| Tension Member Compression Rate(%) | 70 | 75 | 70 | 67 | 61 | 68 |
| Crimp Part Resistance(mΩ) | 0.62 | 0.73 | 0.24 | 0.63 | 0.65 | 0.62 |
| Crimp Part Resistance Performance | Excellent | Excellent | Excellent | Excellent | Excellent | Excellent |
| Tensile Strength (N) | 66 | 70 | 57 | 52 | 45 | 60 |
| Tensile Strength Performance | Excellent | Excellent | Excellent | Excellent | Good | Excellent |
| Anticorrosion Performance | Excellent | Excellent | Excellent | Excellent | Excellent | Excellent |

TABLE 3

| | Working Example 7 | Working Example 8 | Working Example 9 | Working Example 10 | Working Example 11 | Working Example 12 |
|---|---|---|---|---|---|---|
| Cross Sectional Area of Electric Wire | 0.05 sq | 0.05 sq | 0.05 sq | 0.05 sq | 0.05 sq | 0.05 sq |
| Conductive Wire Material | Annealed Copper Wire | Annealed Copper Wire | Hard-drawn Copper Wire | Aluminum Wire | Aluminum Alloy Wire | Corson Alloy Wire |
| Tensile Strength of Conductive Wire Material (MPa) | 234 | 234 | 361 | 70 | 185 | 1100 |
| Tension Member | PBO Fiber | PBO Fiber | PBO Fiber | PBO Fiber | PBO Fiber | PBO Fiber |
| Tensile Strength of Tension Member (MPa) | 4400 | 4400 | 4400 | 4400 | 4400 | 4400 |
| Process for Conductive Wire | None | Collective Plating | Tin Plated | Tin Plated | Tin Plated | Tin Plated |
| Terminal Shape | Pipe | Pipe | Pipe | Pipe | Pipe | Pipe |
| Conductor Compression Rate (%) | 60 | 60 | 60 | 60 | 60 | 60 |
| Tension Member Compression Rate (%) | 70 | 70 | 70 | 70 | 70 | 70 |
| Crimp Part Resistance (mΩ) | 0.60 | 0.62 | 0.88 | 0.71 | 0.74 | 1.41 |
| Crimp Part Resistance Performance | Excellent | Excellent | Excellent | Excellent | Excellent | Good |
| Tensile Strength (N) | 64 | 68 | 66 | 66 | 66 | 66 |
| Tensile Strength Performance | Excellent | Excellent | Excellent | Excellent | Excellent | Excellent |
| Anticorrosion Performance | Excellent | Excellent | Excellent | Excellent | Excellent | Excellent |

TABLE 4

| | Working Example 13 | Working Example 14 | Working Example 15 | Working Example 16 |
|---|---|---|---|---|
| Cross Sectional Area of Electric Wire | 0.05 sq | 0.05 sq | 0.05 sq | 0.05 sq |
| Conductive Wire Material | Aluminum Wire | Annealed Copper Wire | Annealed Copper Wire | Annealed Copper Wire |

TABLE 4-continued

| | Working Example 13 | Working Example 14 | Working Example 15 | Working Example 16 |
|---|---|---|---|---|
| Tensile Strength of Conductive Wire Material (MPa) | 70 | 234 | 234 | 234 |
| Tension Member | Aramid Fiber | PBO Fiber | PBO Fiber | PBO Fiber |

TABLE 4-continued

| | Working Example 13 | Working Example 14 | Working Example 15 | Working Example 16 |
|---|---|---|---|---|
| Tensile Strength of Tension Member (MPa) | 3100 | 4400 | 4400 | 4400 |
| Process for Conductive Wire | Tin Plated | Tin Plated | Tin Plated | Tin Plated |
| Terminal Shape | Pipe | Open-Barrel Lap | Open-Barrel Zigzag | Open-Barrel (No digging) |
| Conductor Compression Rate (%) | 60 | 60 | 60 | 60 |
| Tension Member Compression Rate (%) | 70 | 70 | 70 | 70 |
| Crimp Part Resistance (mΩ) | 0.70 | 0.89 | 0.93 | 0.90 |
| Crimp Part Resistance Performance | Excellent | Excellent | Excellent | Excellent |
| Tensile Strength (N) | 60 | 58 | 51 | 57 |
| Tensile Strength Performance | Excellent | Excellent | Excellent | Excellent |
| Anticorrosion Performance | Excellent | Excellent | Excellent | Excellent |

TABLE 5

| | Working Example 17 | Working Example 18 | Working Example 19 | Working Example 20 |
|---|---|---|---|---|
| Cross Sectional Area of Electric Wire | 0.35 sq | 0.35 sq | 0.3 sq | 0.3 sq |
| Conductive Wire Material | Annealed Copper Wire | Annealed Copper Wire | Annealed Copper Wire | Annealed Copper Wire |
| Tensile Strength of Conductive Wire Material (MPa) | 234 | 234 | 234 | 234 |
| Tension Member | PBO Fiber | Aramid Fiber | PBO Fiber | Aramid Fiber |
| Tensile Strength of Tension Member (MPa) | 4400 | 3100 | 4400 | 3100 |
| Process for Conductive Wire | Tin Plated | Tin Plated | Tin Plated | Tin Plated |
| Terminal Shape | Pipe | Pipe | Pipe | Pipe |
| Conductor Compression Rate (%) | 60 | 60 | 60 | 60 |
| Tension Member Compression Rate (%) | 75 | 75 | 75 | 75 |
| Crimp Part Resistance (mΩ) | 0.24 | 0.25 | 0.28 | 0.30 |
| Crimp Part Resistance Performance | Excellent | Excellent | Excellent | Excellent |
| Tensile Strength (N) | 94 | 92 | 87 | 88 |
| Tensile Strength Performance | Excellent | Excellent | Excellent | Excellent |
| Anticorrosion Performance | Excellent | Excellent | Excellent | Excellent |

TABLE 6

| | Working Example 21 | Working Example 22 | Working Example 23 | Working Example 24 | Working Example 25 | Working Example 26 |
|---|---|---|---|---|---|---|
| Cross Sectional Area of Electric Wire | 0.13 | 0.13 | 0.13 | 0.13 | 0.13 | 0.13 |
| Conductive Wire Material | Annealed Copper Wire | Annealed Copper Wire | 0.7Sn Copper Wire | 0.3Sn Copper Wire | Hard-drawn Copper Wire | 0.15Sn Copper Wire |
| Tensile Strength of Conductive Wire Material (MPa) | 234 | 234 | 655 | 550 | 361 | 530 |
| Tension Member | PBO Fiber | Aramid Fiber | PBO Fiber | PBO Fiber | PBO Fiber | PBO Fiber |
| Tensile Strength of Tension Member (MPa) | 4400 | 3100 | 4400 | 4400 | 4400 | 4400 |
| Process for Conductive Wire | Tin Plated | Tin Plated | Tin Plated | Tin Plated | Tin Plated | Tin Plated |
| Terminal Shape | Pipe | Pipe | Pipe | Pipe | Pipe | Pipe |
| Conductor Compression Rate (%) | 60 | 60 | 60 | 60 | 60 | 60 |
| Tension Member Compression Rate (%) | 75 | 75 | 75 | 75 | 75 | 75 |
| Crimp Part Resistance (mΩ) | 0.48 | 0.47 | 0.44 | 0.5 | 0.48 | 0.48 |
| Crimp Part Resistance Performance | Excellent | Excellent | Excellent | Excellent | Excellent | Excellent |

TABLE 6-continued

| | Working Example 21 | Working Example 22 | Working Example 23 | Working Example 24 | Working Example 25 | Working Example 26 |
|---|---|---|---|---|---|---|
| Tensile Strength (N) | 77 | 75 | 78 | 76 | 77 | 74 |
| Tensile Strength Performance | Excellent | Excellent | Excellent | Excellent | Excellent | Excellent |
| Anticorrosion Performance | Excellent | Excellent | Excellent | Excellent | Excellent | Excellent |

TABLE 7

| | Working Example 27 | Working Example 28 | Working Example 29 | Working Example 30 | Working Example 31 | Working Example 32 |
|---|---|---|---|---|---|---|
| Cross Sectional Area of Electric Wire | 0.08 | 0.08 | 0.08 | 0.08 | 0.08 | 0.08 |
| Conductive Wire Material | Annealed Copper Wire | Annealed Copper Wire | 0.7Sn Copper Wire | 0.3Sn Copper Wire | 0.15Sn Copper Wire | Hard-drawn Copper Wire |
| Tensile Strength of Conductive Wire Material (MPa) | 234 | 234 | 655 | 550 | 530 | 361 |
| Tension Member | PBO Fiber | Aramid Fiber | PBO Fiber | Aramid Fiber | PBO Fiber | PBO Fiber |
| Tensile Strength of Tension Member (MPa) | 4400 | 3100 | 4400 | 3100 | 4400 | 4400 |
| Process for Conductive Wire | Tin Plated | Tin Plated | Tin Plated | Tin Plated | Tin Plated | Tin Plated |
| Terminal Shape | Pipe | Pipe | Pipe | Pipe | Pipe | Pipe |
| Conductor Compression Rate (%) | 60 | 60 | 60 | 60 | 60 | 60 |
| Tension Member Compression Rate (%) | 75 | 75 | 75 | 75 | 75 | 75 |
| Crimp Part Resistance (mΩ) | 0.55 | 0.53 | 0.57 | 0.57 | 0.56 | 0.58 |
| Crimp Part Resistance Performance | Excellent | Excellent | Excellent | Excellent | Excellent | Excellent |
| Tensile Strength (N) | 72 | 72 | 73 | 72 | 71 | 72 |
| Tensile Strength Performance | Excellent | Excellent | Excellent | Excellent | Excellent | Excellent |
| Anticorrosion Performance | Excellent | Excellent | Excellent | Excellent | Excellent | Excellent |

TABLE 8

| | Working Example 33 | Working Example 34 | Working Example 35 |
|---|---|---|---|
| Cross Sectional Area of Electric Wire | 0.13 | 0.08 | 0.05 |
| Conductive Wire Material | *Copper Alloy Wire | *Copper Alloy Wire | *Copper Alloy Wire |
| Tensile Strength of Conductive Wire Material (MPa) | 527 | 527 | 527 |
| Tension Member | PBO Fiber | PBO Fiber | PBO Fiber |
| Tensile Strength of Tension Member (MPa) | 4400 | 4400 | 4400 |
| Process for Conductive Wire | Tin Plated | Tin Plated | Tin Plated |
| Terminal Shape | Pipe | Pipe | Pipe |
| Conductor Compression Rate (%) | 60 | 60 | 60 |
| Tension Member Compression Rate (%) | 75 | 75 | 75 |
| Crimp Part Resistance (mΩ) | 0.44 | 0.52 | 0.63 |
| Crimp Part Resistance Performance | Excellent | Excellent | Excellent |

TABLE 8-continued

| | Working Example 33 | Working Example 34 | Working Example 35 |
|---|---|---|---|
| Tensile Strength (N) | 76 | 71 | 67 |
| Tensile Strength Performance | Excellent | Excellent | Excellent |
| Anticorrosion Performance | Excellent | Excellent | Excellent |

*Copper Alloy Wire: 0.51 Fe—0.11 Ti—0.13 Mg—Cu and unavoidable impurities for the rest (mass %)

TABLE 9

| | Comparison Example 1 | Comparison Example 2 | Comparison Example 3 | Comparison Example 4 | Comparison Example 5 |
|---|---|---|---|---|---|
| Cross Sectional Area of Electric Wire | 0.05 sq | 0.05 sq | 0.05 sq | 0.05 sq | 0.05 sq |
| Conductive Wire Material | Annealed Copper Wire | Annealed Copper Wire | Annealed Copper Wire | Annealed Copper Wire | Annealed Copper Wire |

TABLE 9-continued

| | Comparison Example 1 | Comparison Example 2 | Comparison Example 3 | Comparison Example 4 | Comparison Example 5 |
|---|---|---|---|---|---|
| Tensile Strength of Conductive Wire Material (MPa) | 234 | 234 | 234 | 234 | 234 |
| Tension Member | None | None | None | PBO Single Wire | PBO Single Wire |
| Tensile Strength of Tension Member (MPa) | — | — | — | 4400 | 4400 |
| Process for Conductive Wire | Tin Plated | Tin Plated | Tin Plated | Tin Plated | Tin Plated |
| Terminal Shape | Pipe | Pipe | Pipe | Pipe | Pipe |
| Conductor Compression Rate (%) | 60 | 75 | 40 | 60 | 40 |
| Tension Member Compression Rate (%) | — | — | — | 90 | 85 |
| Crimp Part Resistance (mΩ) | 0.57 | 2.43 | 0.33 | 3.11 | 5.59 |
| Crimp Part Resistance Performance | Excellent | Bad | Excellent | Bad | Bad |
| Tensile Strength (N) | 25 | 72 | 15 | 60 | 60 |
| Tensile Strength Performance | Bad | Excellent | Bad | Excellent | Excellent |
| Anticorrosion Performance | Excellent | Excellent | Excellent | Excellent | Excellent |

TABLE 10

| | Comparison Example 6 | Comparison Example 7 | Comparison Example 8 | Comparison Example 9 |
|---|---|---|---|---|
| Cross Sectional Area of Electric Wire | 0.05 sq | 0.05 | 0.05 sq | 0.05 sq |
| Conductive Wire Material | Annealed Copper Wire | Annealed Copper Wire | Annealed Copper Wire | Annealed Copper Wire |
| Tensile Strength of Conductive Wire Material (MPa) | 234 | 234 | 234 | 234 |
| Tension Member | PBO Single Wire | Stainless Single Wire | Nylon Fiber | PBO Fiber |
| Tensile Strength of Tension Member (MPa) | 4400 | 3000 | 40 | 4400 |
| Process for Conductive Wire | Tin Plated | Tin Plated | Tin Plated | Tin Plated |
| Terminal Shape | Pipe | Pipe | Pipe | Open-Barrel (With digging) |
| Conductor Compression Rate (%) | 90 | 60 | 60 | 90 |
| Tension Member Compression Rate (%) | 98 | 90 | 60 | 85 |
| Crimp Part Resistance (mΩ) | 1.25 | 3.58 | 0.54 | 5.84 |
| Crimp Part Resistance Performance | Good | Bad | Excellent | Bad |
| Tensile Strength (N) | 12 | 59 | 18 | 11 |
| Tensile Strength Performance | Bad | Excellent | Bad | Bad |
| Anticorrosion Performance | Excellent | Bad | Excellent | Excellent |

"Cross-Sectional Area of Electric Wire" is the total cross-sectional area of the conductors. "Conductor Material" is the material forming the conductive wire, and "Tension Member" shows the material forming the tension member. "Fiber" for "Tension Member" shows that the tension member is formed by bundling together a plurality of thin strands (fibers), and "Single Wire" refers to a single thick tension member.

"Process for Conductive Wire" refers to the end process of the conductive wire, wherein "Tin Plated" means that the individual conductor is tin plated as shown in FIG. 4C, and "Collective Plating" means that the entire conductors are tin plated collectively as shown in FIG. 4B.

"Pipe" for "Terminal Shape" means that the terminal is in a pipe shape as the terminal 1 shown in FIG. 1. Also, "Open-Barrel Lapped" refers to the shape shown in FIG. 10A, "Open-Barrel Zigzag" refers to the shape shown in FIG. 9A, "Open-Barrel (No digging)" refers to the shape shown in FIG. 10B, and "Open-Barrel (With digging)" refers to the shape shown in FIG. 10C.

"Conductor Compression Rate" is the total cross-sectional area of the conductors after crimping to the total cross-sectional area of the conductors before crimping at the conductive wire crimp part. Also, "Tension Member Compression Rate" is the apparent compression rate of the region of the tension member, and is the cross-sectional area of the region surrounded by the conductive wires after crimping to the cross-sectional area of the region surrounded by the conductive wires before crimping at the conductive wire crimp part.

"Crimp Part Resistance" is an electric resistance between a front end of the terminal and a rear end of the coated conductive wire of 100 mm length. "Crimp Part Resistance" is marked as "Excellent" for the resistance less than 1 mΩ, marked as "Good" for the resistance between 1 mΩ and 2 mΩ, and marked as "Bad" for the resistance more than 2 mΩ. "Tensile Strength" is a load to pull out the coated conductive wire from the terminal. "Tensile Strength Performance" is marked as "Excellent" for tensile strength of 50N or more, "Good" for tensile strength equal to or more than 40N and less than 50N, and "Bad" for tensile strength of less than 40N. Also, "Anticorrosion Performance" is measured by spraying salt water having a concentration of 5 mass % at a temperature of 35° C. at pressure between 68.6 kPa and 176.5 kPa for 96 hours, and then leaving at a temperature of 80° C. with humidity between 90% and 95% for 96 hours. After that, samples are dried at room temperature to be checked for electrical conductivity, and those have electrical conductivity are marked as "Excellent".

As shown in Table 2 to Table 8, both the crimp part resistance and Tensile Strength Performances are "Good" or "Excellent" in every sample in which tensile strength of the tension member is greater than that of the conductive wire, the tension member is formed of the plurality of strands, and the cross-sectional area of the electric wire is between 0.05 sq and 0.35 sq. In particular, Crimp Part Resistance Performance is "Excellent" for all the above cases except in the case in which the conductive wire material is other than Corson alloy wire. Also, Tensile Strength Performance is "Excellent" for all those having the tension member made of resin fiber other than carbon fiber.

On the other hand, Comparison Example 1 or 3 does not include the tension member and is crimped moderately or strongly. Thus, when being crimped, the conductive wire breaks, which results in "Bad" for Tensile Strength Performance. In contrast, Comparison Example 2 is crimped weakly, and thus Tensile Strength Performance is "Excellent". However, an oxide film on the surface of the conductive wire is not destroyed satisfactory, and thus Crimp Part Resistance Performance is marked as "Bad".

In Comparison Examples 4 and 5, the tension member is single wired and the outer surface of the tension member hardly deforms. Thus, the conductive wire is crashed excessively and breaks at the time of crimping, and Crimp Part Resistance Performance is "Bad". On the other hand, in Comparison Example 6, crimping is weaker than in Comparison Examples 4 and 5, which suppresses crashing of the conductive wire and resulting "Good" in Crimp Part Resistance Performance. However, crimping is insufficient and thus Tensile Strength Performance is "Bad". Similarly in Comparison Example 7, the tension member is single wired and the outer surface hardy deforms. Thus, Crimp Part Resistance Performance is "Bad" and, furthermore, copper and stainless wires are in contact with each other and thus Anticorrosion Performance is "Bad" due to electrolytic corrosion between different metals.

Also, in Comparison Example 8, although the tension member is made of resin fiber, tensile strength of the tension member is lower than that of the conductive wire material and thus the tension member is crashed when being crimped, which results in "Bad" in Tensile Strength Performance. Also, in Comparison Example 9, the barrel pieces at the conductive crimp part dig into the tension member, disturbing the arrangement of the conductors, and thus Crimp Part Resistance Performance is "Bad". Furthermore, the tension member is also damaged and thus Tensile Strength Performance is also "Bad".

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

Figure 11A:
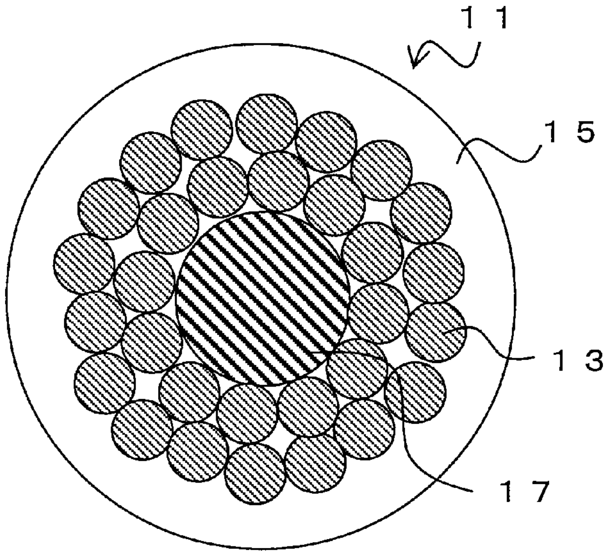
FIG. 11A is a view showing a cross section of another form of the coated conductive wire 11.
Figure 11B:
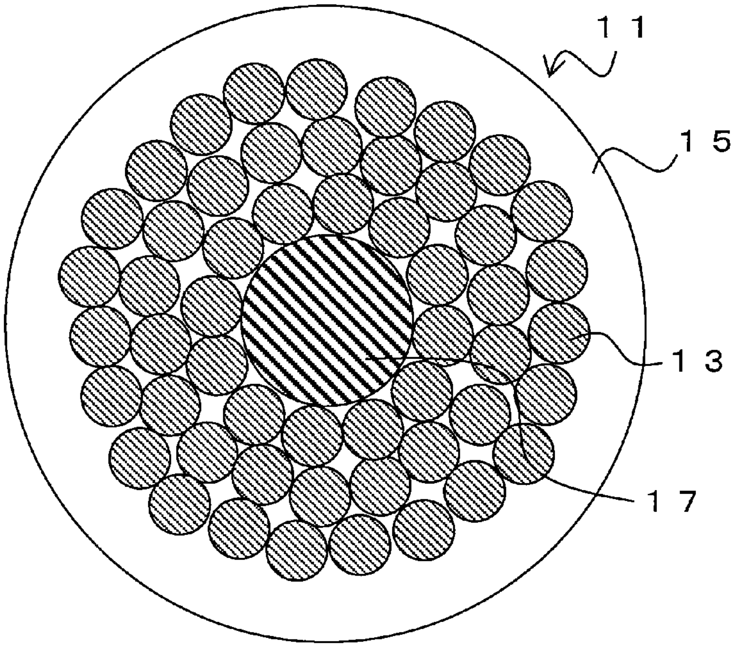
FIG. 11B is a view showing a cross section of another form of the coated conductive wire 11.

For example, the above descriptions illustrate the examples in which one layer of the conductive wire 13 is disposed on the outer periphery of the tension member 17. However, there are various ways of disposing the conductive wire 13. If the conductive wire 13 is disposed on a side of the outer periphery of the tension member 17, two layers of the conductive wire 13 may be disposed around the tension member 17 as shown in FIG. 11A, or three layers of the conductive wire 13 may be disposed around the tension member 17 as shown in FIG. 11B. Also, the number of the conductive wires 13 is at least three for a layer that is in contact with the tension member 17, and is preferably twenty or less, in view of conductivity and strength of the conductive wire 13. For example, the number of the conductive wires 13 may be twelve or fourteen as shown in FIGS. 4B to 4D, FIG. 5, FIG. 11A, FIG. 11B, etc. or may be six or eight.

Also, in the descriptions above, examples in which the tension member 17 is formed of the plurality of strands 17*a* are described. However, the tension member 17 may be single wired if the outer shape of the tension member 17 can deform with the conductive wire 13 at the time of crimping and there are uneven shapes formed on the outer periphery thereof after compression. For example, in the above Comparison Examples 4 to 7, although the tension member is single wired and failed the evaluation, it is possible to suppress deterioration of Crimp Part Resistance Performance if the outer surface of the tension member can deform slightly. However, the tension member 17 does not function as a tension member if the tension member 17 is more deformable than the conductive wire 13. Thus, at the time of crimping, it is preferable that there is small unevenness formed on the surface of the tension member due to pressure from the conductive wire 13 when the conductive wire 13 primarily crashes and extends in the axial direction.

DESCRIPTION OF NOTATIONS

1, 1*a* . . . terminal
3 . . . terminal body
4 . . . transition part
5 . . . crimp part
7 . . . conductive wire crimp part
9 . . . coating crimp part
10, 10*a* . . . terminal-equipped electric wire
11 . . . coated conductive wire
13 . . . conductive wire
15 . . . coating
17 . . . tension member
17*a* . . . tension member strand
19 . . . processed end part
21 . . . plating layer
23 . . . gap

What is claimed is:

1. A terminal-equipped electric wire in which a coated conductive wire and a terminal are electrically connected to each other, the coated conductive wire comprising:

a tension member; and a conductive wire that is disposed on an outer periphery of the tension member and is formed of a plurality of conductors, wherein a cross-sectional area of the conductive wire is 0.35 $mm^2$ or less;

tensile strength of the tension member is greater than tensile strength of the conductive wire, the terminal comprising:

a conductive wire crimp part at which the conductive wire being exposed from a coating at a tip end of the coated conductive wire is crimped; and a coating crimp part at which the coating of the coated conductive wire is crimped, wherein the conductive wire is crimped at the conductive wire crimp part from an entire circumference of a circumferential direction of the conductive wire;

an unevenness is formed on an outer periphery surface of the tension member and the conductive wire deforms being fitted along the unevenness shape; and the conductive wire is crimped at the conductive wire crimp part so that the conductive wire does not break.

2. The terminal-equipped electric wire according to claim 1, wherein the tension member comprises a plurality of strands.

3. The terminal-equipped electric wire according to claim 1, wherein a compression rate of the conductive wire is equal to or less than an apparent compression rate of a region on which the tension member is disposed; wherein the compression rate of the conductor wire is defined as "a total cross-sectional area of the conductor wire after crimping/a total cross-sectional area of the conductor wire before crimping" and the apparent compression rate of the tension member is defined as "a cross-sectional area of a region of the tension member after crimping/a cross-sectional area of a region of the tension member before crimping".

4. The terminal-equipped electric wire according to claim 1, wherein the conductive wire is twisted on the outer periphery of the tension member.

5. The terminal-equipped electric wire according to claim 1, wherein at least a tip end of the conductive wire is compressed from an outer periphery side.

6. The terminal-equipped electric wire according to claim 1, wherein the plurality of conductors are coated with a plating.

7. The terminal-equipped electric wire according to claim 1, wherein the conductive wire is crimped at the conductive wire crimp part from the entire circumference at a predetermined position in an axial direction.

8. The terminal-equipped electric wire according to claim 1, wherein the conductive wire crimp part is not in contact with the tension member.

9. The terminal-equipped electric wire according to claim 1, wherein the cross-sectional area of the conductive wire is 0.3 $mm^2$ or less.

10. A wire harness comprising:

a plurality of terminal-equipped electric wires including the terminal-equipped electric wire according to claim 1, wherein the plurality of terminal-equipped electric wires are unified together as one body.

11. A method for manufacturing the terminal-equipped electric wire according to claim 1, the method comprising:

crimping the conductive wire crimp part, wherein both the compression rate of the conductive wire and the apparent compression rate of the tension member are reduced in an early stage of compression; wherein the compression rate of the conductor wire is defined as "a total cross-sectional area of the conductor wire after crimping/a total cross-sectional area of the conductor wire before crimping" and the apparent compression rate of the tension member is defined as "a cross-sectional area of a region of the tension member after crimping/a cross-sectional area of a region of the tension member before crimping"; and by compressing further, a rate of reduction in the apparent compression rate of the tension member becomes smaller than a rate of reduction in the compression rate of the conductive wire.

* * * * *